United States Patent [19]

Tanaka et al.

[11] Patent Number: 4,779,147
[45] Date of Patent: Oct. 18, 1988

[54] AUTOMATIC MODE CHANGEOVER MECHANISM FOR A TAPE RECORDER

[75] Inventors: Shinsaku Tanaka, Tokyo; Toshio Yoshimura, Kawasaki, both of Japan

[73] Assignee: Tanashin Denki Co., Ltd., Shinmachi, Japan

[21] Appl. No.: 938,614

[22] Filed: Dec. 5, 1986

[30] Foreign Application Priority Data

Feb. 20, 1986 [JP] Japan .............................. 61-23462[U]

[51] Int. Cl.$^4$ .............................................. G11B 15/48
[52] U.S. Cl. .................................... 360/74.1; 360/96.1
[58] Field of Search ............................. 360/96.1–96.4, 360/90, 93, 74.1, 137

[56] References Cited

U.S. PATENT DOCUMENTS

| | | | |
|---|---|---|---|
| 4,464,695 | 8/1984 | Kommoss et al. | 360/96.4 X |
| 4,471,398 | 9/1984 | Kommoss et al. | 360/137 |
| 4,661,866 | 4/1987 | Kunze | 360/96.1 |

*Primary Examiner*—John H. Wolff
*Attorney, Agent, or Firm*—Wegner & Bretschneider

[57] ABSTRACT

A tape recorder which includes an automatic reversing mechanism and wherein fast feeding or rewinding of a tape started manually is ended by releasing an operating member therefor from an actuated arrested position when the tape comes to its end is improved in operability with a simplified construction at a reduced cost. The tape recorder comprises a trigger member for mechanically detecting stopping of a reel receiving member to activate a tape feeding direction change-over mechansim, a pair of operating members manually operable for initiating a fast feeding or a rewinding operation, an arresting mechanism operable for arresting an actuated operating member to its actuated position, a transmission member operable in response to the actuated operating member for operating the trigger member, and a tape feeding direction change-over member mounted for engagement by the operating members. When a tape comes to its end while one of the operating members is arrested to its actuated position, the trigger member urges the transmission member to release the operating member from its arrested position.

3 Claims, 12 Drawing Sheets

AUTOMATIC MODE CHANGEOVER MECHANISM FOR A TAPE RECORDER

BACKGROUND OF THE INVENTION

1. Field of the Invention

This invention relates to a tape recorder.

2. Description of the Prior Art

A tape recorder which includes an automatic reversing mechanism and wherein a fast feeding operation and a rewinding operation can be started suitably by manual operation is already known by a Japanese patent laid-open No. 60-138752. The inventor of the present patent application has developed and proposed in a Japanese patent application No. 59-275683 a further improved mechanism wherein one of two operating members for fast feeding and rewinding operations which is selectively arrested to an actuated position is released from the actuated position in response to arrival of an end of a tape to return the system to a recording or reproduction mode.

However, in a tape recorder which includes an automatic reversing mechanism and wherein a fast feeding operation and a rewinding operation can be started manually and one of operating members for fast feeding and rewinding operations which is selectively arrested to an actuated position by an arresting means is released from the actuated position in response to arrival of an end of a tape, a complicated structure is required to attain the intended features. Thus, it is a problem that a high cost is required due to such a complicated structure.

SUMMARY OF THE INVENTION

It is an object of the present invention to provide a tape recorder which has such functions as described above and is improved in operability with a simplified construction at a reduced cost.

In order to attain the object, according to the present invention, there is provided a tape recorder of the type which includes a pair of capstan shafts, pinch rollers and reel receiving elements located on opposite left and right sides of a magnetic head, a tape feeding direction change-over mechanism for mechanically changing over the feeding direction of a magnetic tape, and a trigger member for mechanically detecting stopping of said reel receiving elements to activate said tape feeding direction change-over mechanism, and wherein recording or reproducing operation is allowed whether a magnetic tape recorder is fed in a leftward direction or in a rightward direction, comprising first and second operating members mounted for individual reciprocal movement in a parallel relationship to each other and each operable, when it is advanced more than a predetermined amount, by a portion of the motion thereof over the predetermined amount for retracting said magnetic head from a recording or reproducing position, an arresting mechanism operable when said first or second operating member is advanced to retract said magnetic head from the recording or reproducing position for arresting the advanced operating member to its actuated position, a transmission member which is moved, when said first operating member is advanced an amount greater than the predetermined amount, by said first operating member to move said trigger member to activate said tape feeding direction change-over mechanism, and a tape feeding direction change-over member mounted for pivotal movement and for linear movement by a fixed amount, said tape feeding direction change-over member being engageable with said first and second operating members, whereby when one of said first and second operating members is alternatively advanced, said tape feeding direction change-over member is pivoted in one or the other direction and allows the one operating member to be moved more than the predetermined amount, but when said first and second operating members are operated at a same time, said tape feeding direction change-over member is held from pivotal motion in either direction and is urged by said first and second operating members to linearly move a predetermined amount and then prohibits further movement of said first and second operating members than the predetermined amount, and when said tape feeding direction change-over member thus effects linear movement, said tape feeding direction change-over member moves said transmission member to operate said tape feeding direction change-over mechanism to move said trigger member to cancel the arresting condition by said arresting mechanism.

The above and other objects, features and advantages of the present invention will become apparent from the following description and the appended claims, taken in conjunction with the accompanying drawing.

DESCRIPTION OF THE PREFERRED EMBODIMENTS

Now, a preferred embodiment of the present invention will be described with reference to the accompanying drawings.

Figure 1:
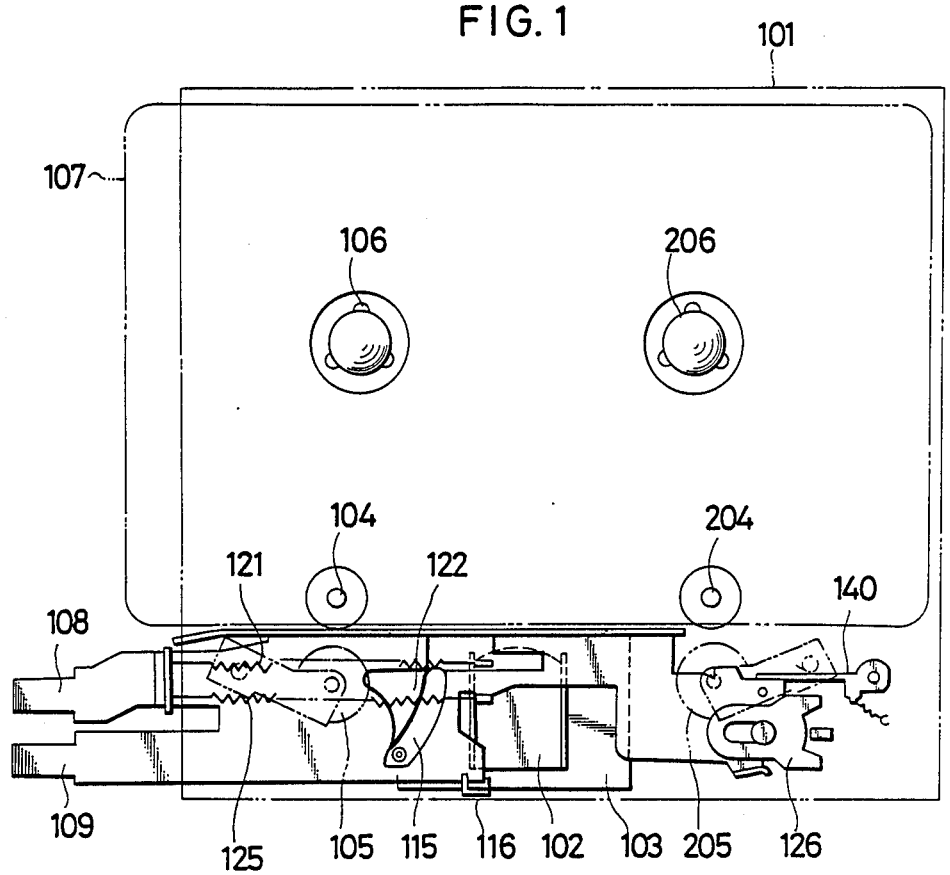
FIG. 1 is a plan view of a tape recorder mechanism illustrating a preferred embodiment of the present invention.

Referring first to FIG. 1, there is shown a tape recorder mechanism according to a preferred embodiment of the present invention.

The tape recorder mechanism shown includes a base plate 101, a head mounting plate 103 mounted for back and forth movement on the base plate 101, and a magnetic head 102 mounted on the head mounting plate 103. A pair of capstan shafts 104, 204, a pair of pinch rollers 105, 205 and a pair of reel shafts 106, 206 are located symmetrically on opposite left and right sides of the magnetic head 102.

In the present tape recorder, after loading of a tape cassette 107 on the reel shafts 106, 206, the head mounting plate 103 is advanced, and then either one of the reel shafts 106, 206 is driven to rotate in a tape winding direction and the capstan shaft 104 or 204 on the same side is contacted by the associated pinch roller 105 or 205 and is rotated to effect desired recording or reproduction.

Two operating members including a first operating member 108 and a second operating member 109 each in the form of a plate are located in an overlapping relationship above the magnetic head 102 and mounting for back and forth movement in a direction perpendicular to the direction of reciprocating movement of the head mounting plate 103. The operating members 108, 109 are each operated manually at a left end thereof.

Figure 2:
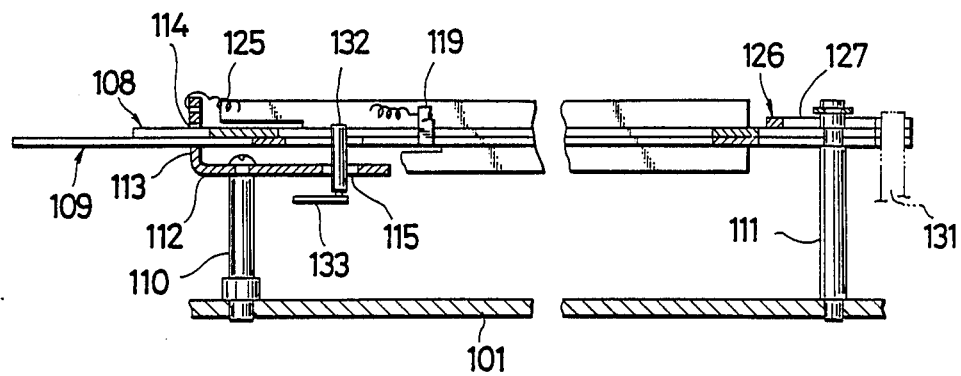
FIG. 2 is a cross sectional view, partly broken, showing first and second operating members in an assembled condition.

FIG. 2 shows a mounting condition of the operating members 108, 109 on the tape recorder base plate 101. Referring to FIG. 2, studs 110, 111 are erected on the base plate 101. A guide plate 112 is secured to the top end of the stud 110 and extends in parallel to the base plate 101. The guide plate 112 is bent at an end thereof and has a guide hole 114 formed in such a bent portion 113 thereof. The guide plate 112 further has a curved guide hole 115 formed adjacent the other end thereof as seen in FIG. 1 and a channel-shaped guide groove 116 formed at a side portion thereof as shown in FIG. 1. The first operating member 108 is received adjacent the operating end thereof in the guide hole 114 of the guide plate 112 and is guided at the other end portion thereof by the top end of the stud 111 while a side portion thereof is guided by the guide groove 116 for back and forth movement. Meanwhile, the second operating member 109 overlies the first operating member 108 and is received adjacent the operating end thereof in the guide hole 114 and guided at the other end portion thereof by the top end of the stud 111 with a side portion thereof received in the guide slot 116 for back and forth movement.

Figure 3:
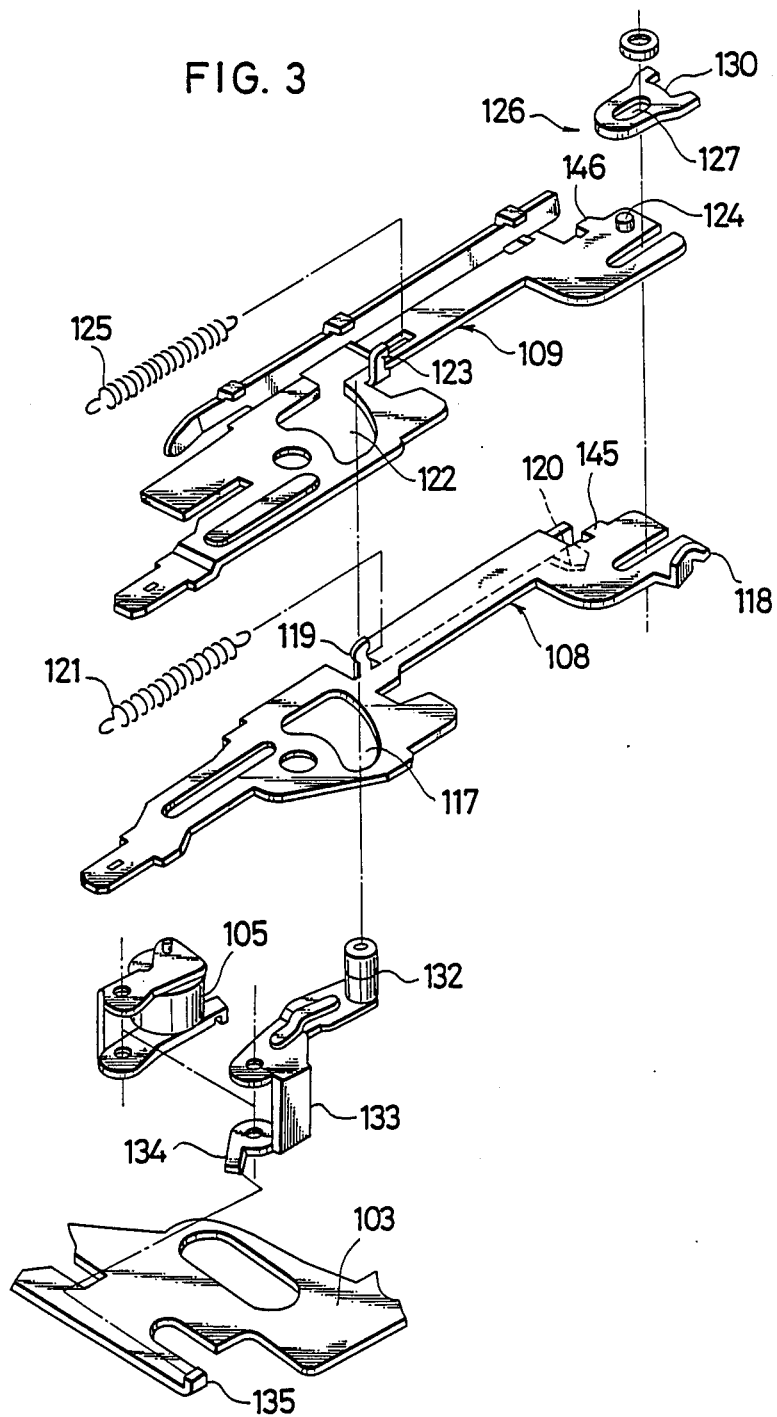
FIG. 3 is a fragmentary perspective view of the first and second operating members and associated parts of the same.

Referring now to FIG. 3, the first operating member 108 has a cam hole 117 formed at a central portion thereof. The cam hole 117 of the first operating member 108 is located above and greater than the guide hole 115 of the guide plate 112. The first operating member 108 further has an upwardly bent direction change-over member pressing portion 118 formed at an end thereof and a spring receiving bent lug 119 formed at a portion thereof adjacent the cam hole 117. The first operating member 108 additionally has a pressing piece 120 formed at a lower end of an end portion thereof on the opposite side to the direction change-over member pressing portion 118. The first operating member 108 is normally urged toward the operating end thereof by a restoring force of a tension spring 121 extending between the spring receiving bent lug 119 thereof and the bent portion 113 of the guide plate 112. Meanwhile, the second operating member 109 has a cam hole 122 formed at a central portion thereof. The cam hole 122 of the second operating member 109 can be located above the cam hole 117 of the first operating member 108. The second operating member 109 further has a spring receiving bent lug 123 formed at a portion thereof adjacent the cam hole 122 and a direction change-over member pressing portion 124 formed on an upper surface adjacent the other end thereof. The second operating member 109 is normally urged toward the operating end thereof by a restoring force of a tension spring 125 extending between the spring receiving bent lug 123 thereof and the bent portion 113 of the guide plate 112.

Figure 4:
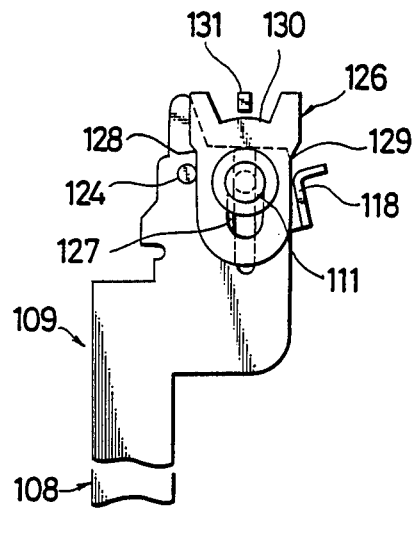
FIGS. 4 to 7 are partial plan views showing different positions of the first and second operating members relative to a tape feeding direction change-over member.

Meanwhile, a tape feeding direction change-over member 126 is mounted at the top end of the stud 111 and overlies the second operating member 109. The tape feeding direction change-over member 126 has an elongated hole 127 formed therein and extending in a same direction with reciprocating movement of the first and second operating members 108, 109. The stud 111 is fitted in the elongated hole 127 of the tape feeding direction change-over member 126 so that the tape feeding direction change-over member 126 may make reciprocal movement in parallel with the operating members 108, 109 and also pivotal movement around the stud 111. The tape feeding direction change-over member 126 has a pair of inclined surfaces 128 and 129 formed on opposite sides thereof as shown in FIG. 4 and located forwardly of the direction change-over member pressing portions 118 and 124 of the first and second operating members 108 and 109, respectively. The tape feeding direction change-over member 126 has an arcuate surface 130 formed at a forward end thereof and having its center of the curvature at a forward end of the elongated hole 127, and an operating force transmitting member 131 which will be described hereinbelow has one end located in an opposing relationship to the arcuate surface 130.

Figure 5:
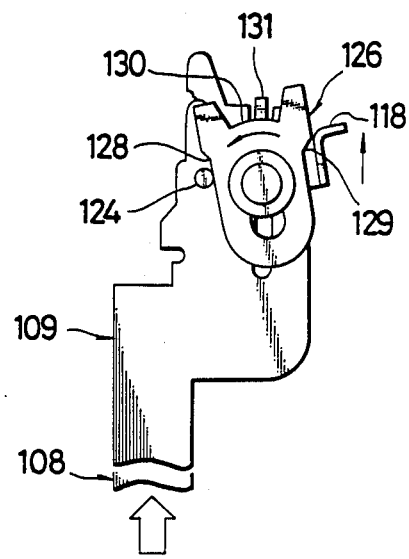
Figure 6:
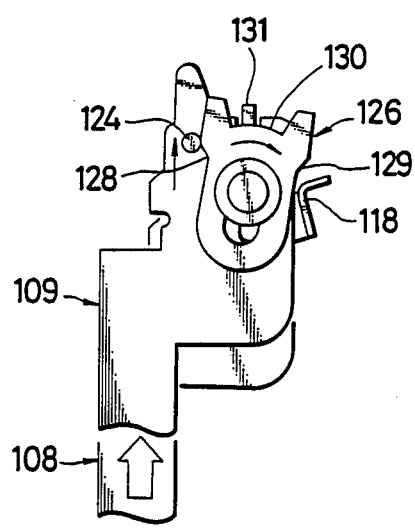
Figure 7:
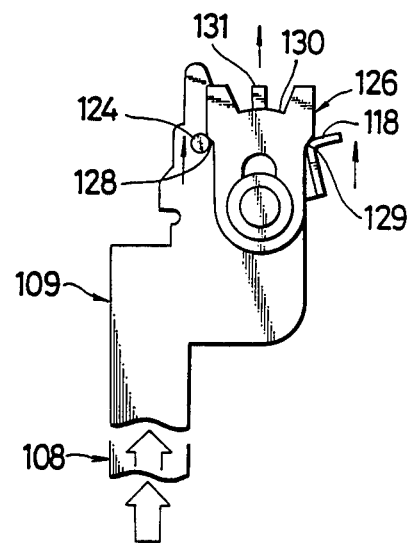

The tape feeding direction change-over member 126 operates as follows. When the first operating member 108 is pushed in against the tension spring 121, the direction change-over member pressing portion 118 thereof presses against the right inclined surface 129 of the tape feeding direction change-over member 126 to pivot the tape feeding direction change-over member 126 leftwardly in a counterclockwise direction as shown in FIG. 5. On the contrary, when the second operating member 109 is pushed in against the tension spring 125, the direction change-over member pressing portion 124 of the second operating member 109 presses against the left inclined surface 128 of the tape feeding direction change-over member 126 to pivot the tape feeding direction change-over member 126 rightwardly in a clockwise direction as shown in FIG. 6. On the other hand, when the first and second operating members 108, 109 are pushed in at a same time, the inclined surfaces 128 and 129 of the tape feeding direction change-over member 126 are pressed simultaneously by the direction change-over member pressing portions 118 and 124 of the first and second operating members 108 and 109, respectively, so that the tape feeding direction change-over member 126 is held from rotation and is thus moved together with the operating members 108, 109 to press the arcuate surface 130 thereof against the operating force transmitting member 131 as shown in FIG. 7.

Figure 8A:
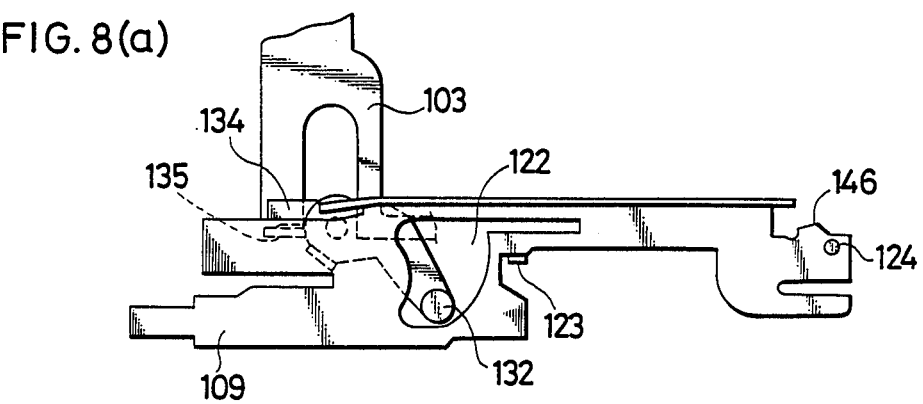
FIGS. 8(a), 8(b) and 9(a), 9(b) are plan views showing different positions of the second and first operating members relative to a head mounting plate retracting mechanism, respectively.
Figure 8B:
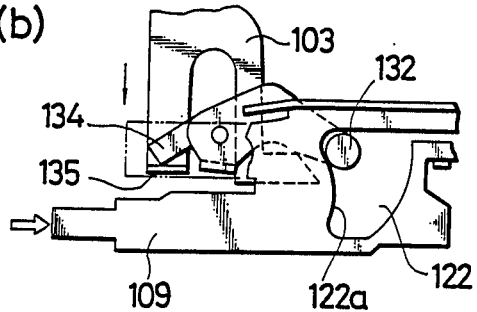
Figure 9A:
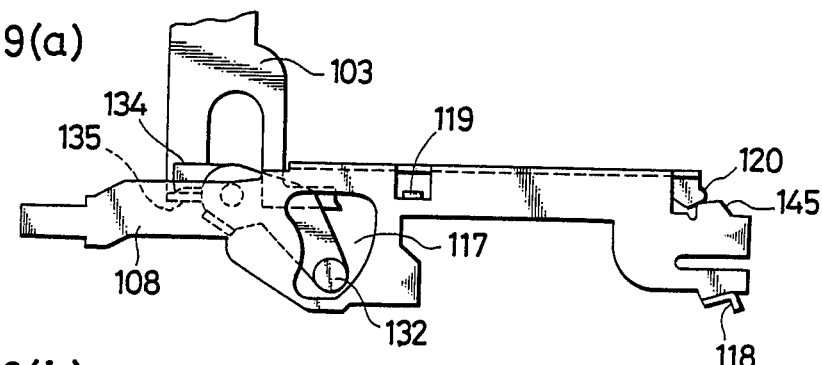
Figure 9B:
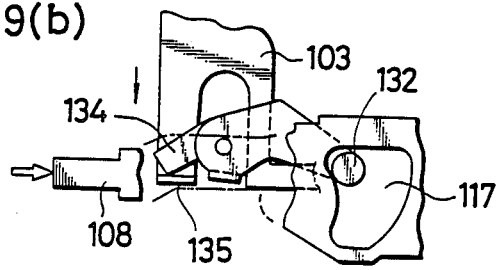

Referring again to FIG. 3, a cam roller 132 extends through the curved guide hole 115 formed in the guide plate 112 and also through the cam holes 117, 122 of the first and second operating members 108, 109, respectively, and is mounted for rotation on a pivotal member 133. The pivotal member 133 is supported for pivotal motion together with a pinch arm for the pinch roller 105 on a shaft which is erected on the base plate 101. The pivotal member 133 has a horizontally extending arresting pawl 134 which is located inside of and normally opposes to an upwardly bent lug 135 formed on the head mounting plate 103. Accordingly, when the second operating member 109 is pushed in from a position as shown in FIG. 8(a) to another position as shown in FIG. 8(b), the cam roller 132 is pushed by a cam surface 122a of the cam hole 122 of the second operating member 109 and rolls along the guide hole 115 of the guide plate 112. Consequently, the pivotal member 133 is pivoted to retract the head mounting plate 103 from a recording or reproducing position. To the contrary, when the first operating member 108 is pushed in from a position as shown in FIG. 9(a) to another position as shown in FIG. 9(b), similarly the pivotal member 133 is pivoted to retract the head mounting member 103. It is to be noted that when the first and second operating members 108, 109 are pushed in at once, rolling motion of the cam roller 132 is hindered by the guide hole 115 of the guide plate 112 and restricted to a predetermined amount. Accordingly, in this instance, the stroke of the first and second operating members 108, 109 when they are pushed in at once is also restricted to a predetermined amount, in particular, to an amount sufficient to allow the tape feeding direction change-over member 126 to be advanced a predetermined amount but to allow no retraction of the head mounting plate 103.

Figure 10:
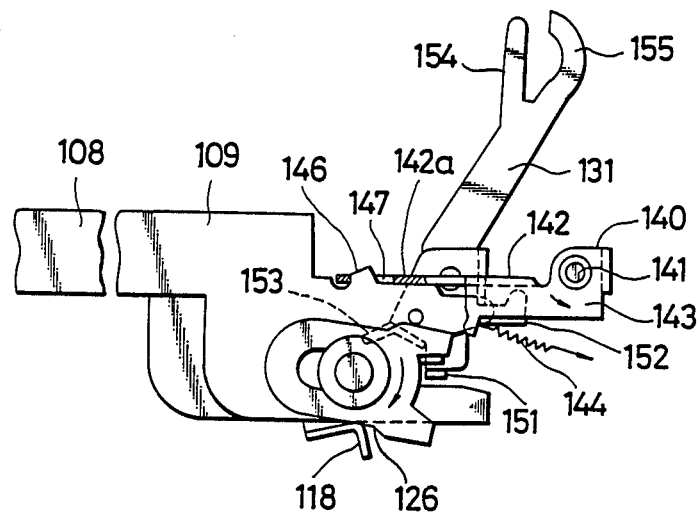
FIG. 10 is a plan view of an arresting mechanism for the first and second operating members.
Figure 11A:
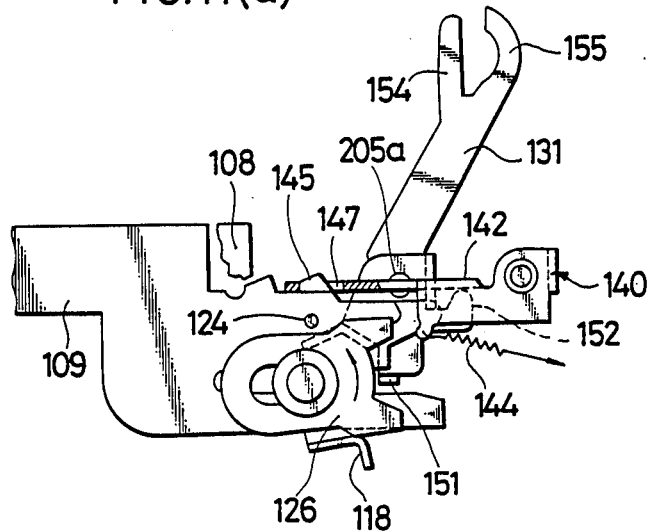
FIGS. 11(a) and 11(b) are plan views showing different positions of the first and second operating members relative to the arresting mechanism.

Referring now to FIG. 10, an arresting mechanism 140 and the operating force transmitting member 131 are located adjacent the tape feeding direction change-over member 126. The arresting mechanism 140 includes a fixed shaft 141 erected on the base plate 101, an arresting member 142 supported for pivotal motion on the fixed shaft 141, and a tension spring 144 for normally urging the arresting member 142 to pivot in a counterclockwise direction as indicated by an arrow mark 143 in FIG. 10. A portion 142a of the arresting member 142 extends along side edges of the ohter end portions of the first and second operating members 108, 109 and has an arresting hole 147 formed therein for selectively arresting one of engaging lugs 145, 146 formed on the first and second operating members 108, 109 adjacent the other end portions of the latter. Accordingly, if the first operating member 108 is pushed in against the tension spring 121, when a predetermined pushed-in position is reached, the engaging lug 145 of the first operating member 108 is arrested by the arresting hole 147 of the arresting member 142 as shown in FIG. 11(a). Consequently, the first operating member 108 is held to the pushed-in position, that is, to an actuated position. Similarly, if the second operating member 109 is pushed in against the tension spring 125, when a predetermined pushed-in position is reached, the engaging portion 146 of the second operating member 109 is arrested by the arresting hole 147 of the arresting member 142. Consequently, the second operating member 109 is held to its pushed-in or actuated position. It is to be noted that such arresting operations are conducted alternatively. In particular, if one of the operating members 108, 109 is pushed in while the other is held in its actuated position, the arrested condition of the other operating member is cancelled when the engaging lug of the one operating member is slidably engaged with the portion 142a of the arresting member 142 and pivots the arresting member 142 in a direction opposite to the direction of the arrow mark 143.

The operating force transmitting member 131 is supported for pivotal motion together with a pinch arm of the pinch roller 205 on a shaft 205a erected on the base plate 101. The operating force transmitting member 131 has, as shown in FIG. 10, a vertically bent lug 151 located in an opposing relationship to the arcuate surface 130 of the tape feeding direction change-over member 126, a projection 152 in the form of a pawl located for contacting engagement with an inner surface of the portion 142a of the arresting member 142, an angle-shaped pressure receiving piece 153 for receiving a pressing force of the pressing piece 120 formed on the first operating member 108, and a pair of pressing pieces 154, 155 extending in a bifurcated shape above the base plate 101.

Figure 12:
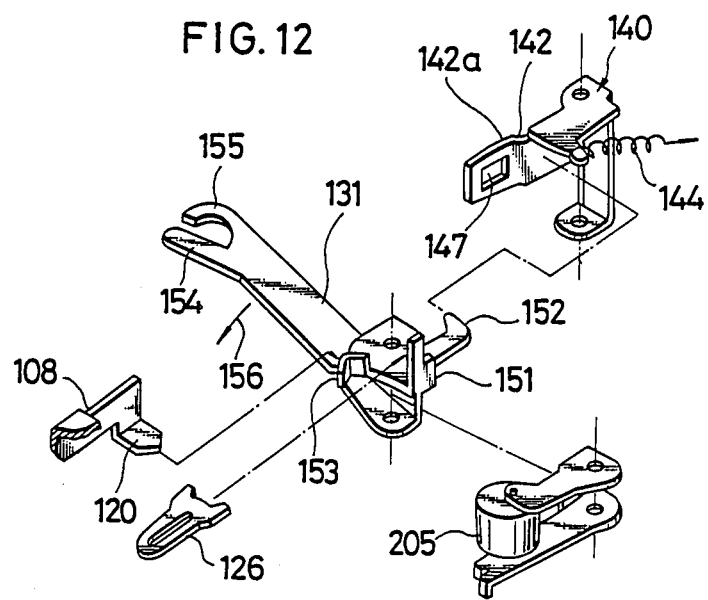
FIG. 12 is a fragmentary perspective view illustrating a relationship of an operating force transmitting member relative to the arresting mechanism.

Now, a relationship between pushing in operations of the first and second operating members 108, 109 and pivotal movement of the operating force transmitting member 131 will be described. If the first operating member 108 is pushed in, the pressing piece 120 thereon presses against the pressure receiving piece 153 of the operating force transmitting member 131 to pivot the operating force transmitting member 131 a predetermined angle in a direction indicated by an arrow mark 156 in FIG. 12 immediately after the engaging lug 145 of the first operating member 108 has been brought into sliding contact with the portion 142a of the arresting member 142. Then, the engaging lug 145 is arrested by the arresting hole 147 of the arresting member 142 and then the operating force transmitting member 131 is returned to its initial position. In the meantime, if the second operating member 109 is pushed in, the operating force transmitting member 131 will effect no pivotal motion. On the other hand, if the first and second operating members 108, 109 are pushed in at a same time, the tape feeding direction change-over member 126 will advance a predetermined amount to press against the vertically bent lug 151 of the operating force transmitting member 131 from a position to which they are pushed in a predetermined amount, as described hereinabove. In this instance, the engaging lugs 145, 146 of the first and second operating members 108, 109 are not arrested by the arresting mechanism 140. Accordingly, the operating force transmitting member 131 pivots a predetermined angle while the operating members 108, 109 are both pushed in.

Figure 13:
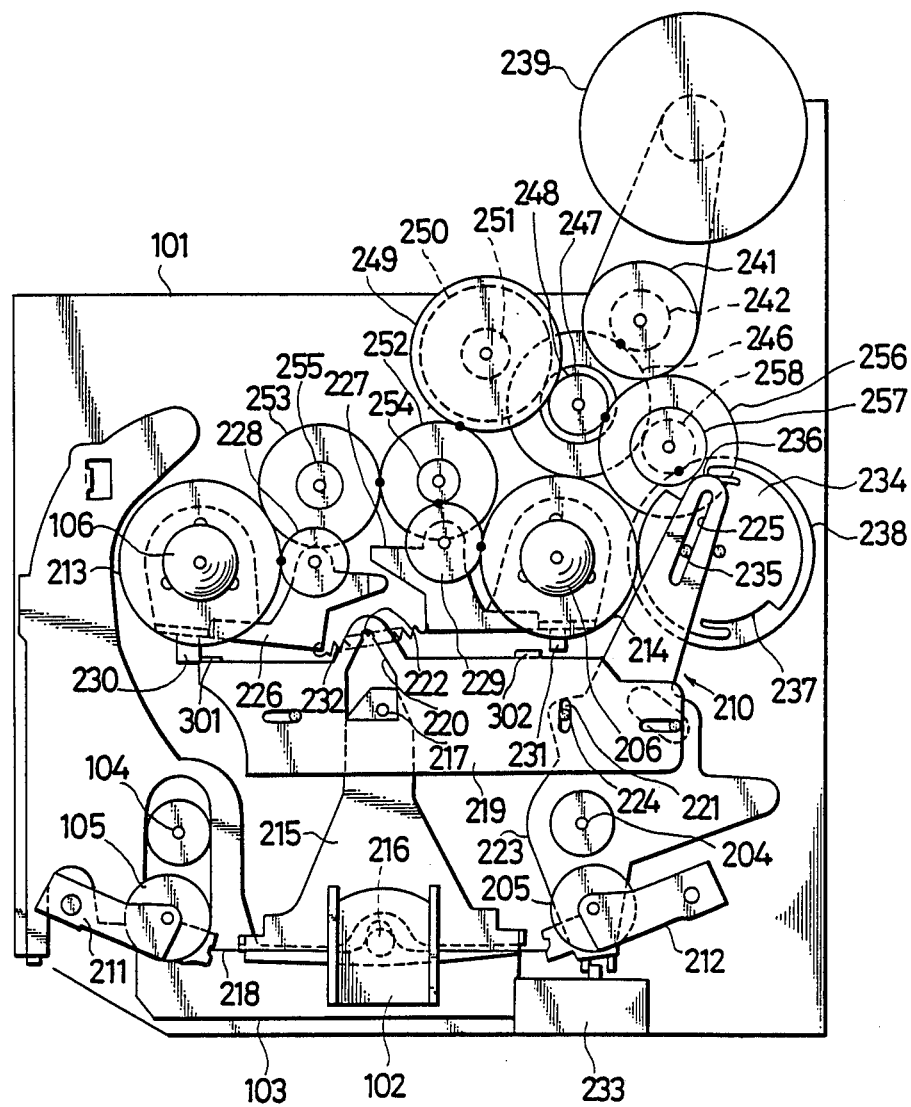
FIG. 13 is a plan view showing a tape feeding direction change-over mechanism of the tape recorder.

FIG. 13 shows a tape feeding direction change-over mechanism 210 and associated mechanisms.

Referring to FIG. 13, the pinch rollers 105, 215 are supported for rotation at pivoting ends of pinch arms 211, 212, respectively. Gears 213, 214 are mounted on base end portions of the reel shafts 106, 216 in a coaxial relationship with the latter, respectively. A pinch roller change-over plate 215 is supported for pivotal motion on a shaft 216 located at an end portion of the head mounting plate 103, and a cam pin 217 is mounted on an upper surface of a forward end portion of the change-over plate 215. A spring rod 218 has a central portion thereof engaged with the shaft 216. The spring rod 218 are engaged at opposite end portions thereof with opposite left and right ends of the change-over plate 215 and at opposite ends thereof with pivoting ends of the left and right pinch arms 211, 212.

A supply side detecting member arresting plate 219 is mounted for back and forth movement in a leftward and rightward direction. The arresting plate 219 has a cam hole 220 formed therein for receiving the cam pin 217 therein and engaging hole 221 elongated in an upward and downward direction in FIG. 13. The cam hole 220 has a pair of front edges which are inclined toward the front center from opposite left and right sides and terminate in a hole 222 for receiving the cam pin 217 therein.

A pivotal change-over plate 223 is mounted for pivotal motion around the right capstan shaft 114. The pivotal change-over plate 223 has an engaging pin 224 mounted thereon and extending through the engageing hole 221 of the arresting plate 219. The pivotal change-over plate 223 further has an elongated hole 225 formed at an end portion thereof.

A pair of pivotal plates 226, 227 are mounted for pivotal motion around the reel shafts 106, 206, respectively. A pair of gears 228, 229 are supported for rotation on the pivotal plates 226, 227 and held in meshing engagement with the gears 213, 214, respectively. The pivotal plates 226, 227 have projections 230, 231, and a tension spring 232 extends betweent the projections 230, 231 to resiliently hold the pivotal plates 226, 227 in position.

A polarity change-over switch 233 is also provided for changing over the polarity of the magnetic head 102 in response to a feeding direction of a tape.

A change-over gear 234 has an engaging pin 235 mounted projectingly on an upper surface thereof and extending into the engaging hole 225 of the pivotal change-over plate 223. The change-over gear 234 has a pair of non-meshing portion 236, 237 formed at two symmetrical positions by cutting away some teeth thereof. A reverse driving gear 238 is mounted in a coaxial relationship below the change-over gear 234.

Figure 14:
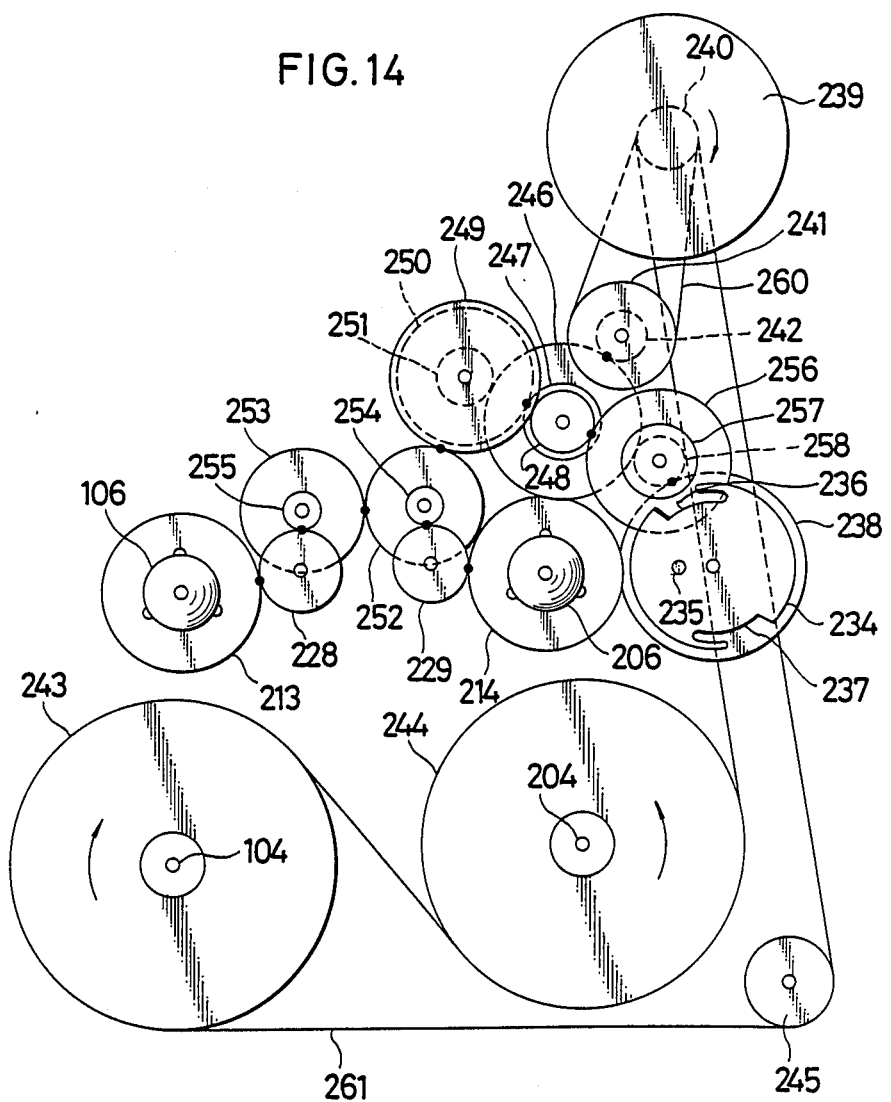
FIG. 14 is a plan view illustrating a route of transmission of rotartion.
Figure 15:
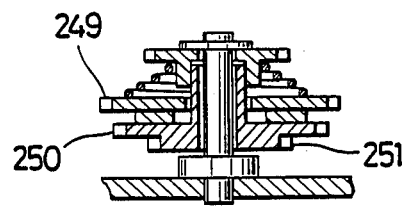
FIG. 15 is a vertical sectional view showing an overload slip mechanism.

FIG. 14 particularly illustrates a rotation transmitting route which transmits a turning force from a motor 239 to the left and right capstan shaft 104, 204 and the gears 213, 214. The rotation transmitting route incudes a motor pulley 240, a follower pulley 241 supported or rotation on a lower surface of the tape recorder base plate 101, and a gear 242 formed in an integral relationship on a lower surface of the follower pulley 241. The rotation transmitting route further includes a pair of fly wheels 243, 244 securely fixed to the capstan shafts 104, 204, respectively, and each having a belt groove formed on an outer periphery thereof, a guide pulley 245 supported for rotation on the lower surface of the tape recorder base plate 101, three integral gears 246, 247, 248, and further gears 249, 250, 251 mounted in a coaxial relationship and connected to each other by means of a spring and a friction mechanism as shown in FIG. 15. Thus, a turning force of the gear 249 is transmitted to the gears 228, 229 by way of gears 252, 253 and small gears 254, 255. Integral gears 256, 257, 258 are also provided.

The motor pulley 240 and the follower pulley 241 are interconnected by an endless belt 260. The motor pulley 240, the left and right fly wheels 243, 244 and the guide pulley 245 are interconnected by another endless belt 261 such that the left and right fly wheels may be rotated in opposite directions relative to each other. Meanwhile, rotation of the follwer pulley 241 is transmitted to the reel shaft 206 via the gears 246, 247, 250, 252, 229 and 214. Further, rotation of the gear 252 is transmitted to the reel shaft 106 via the gears 253, 255, 228 and 213. Rotation of the follower pulley 241 is also transmitted to the reverse driving gear 238 via the gears 246, 248, 256 and 257.

Figure 16:
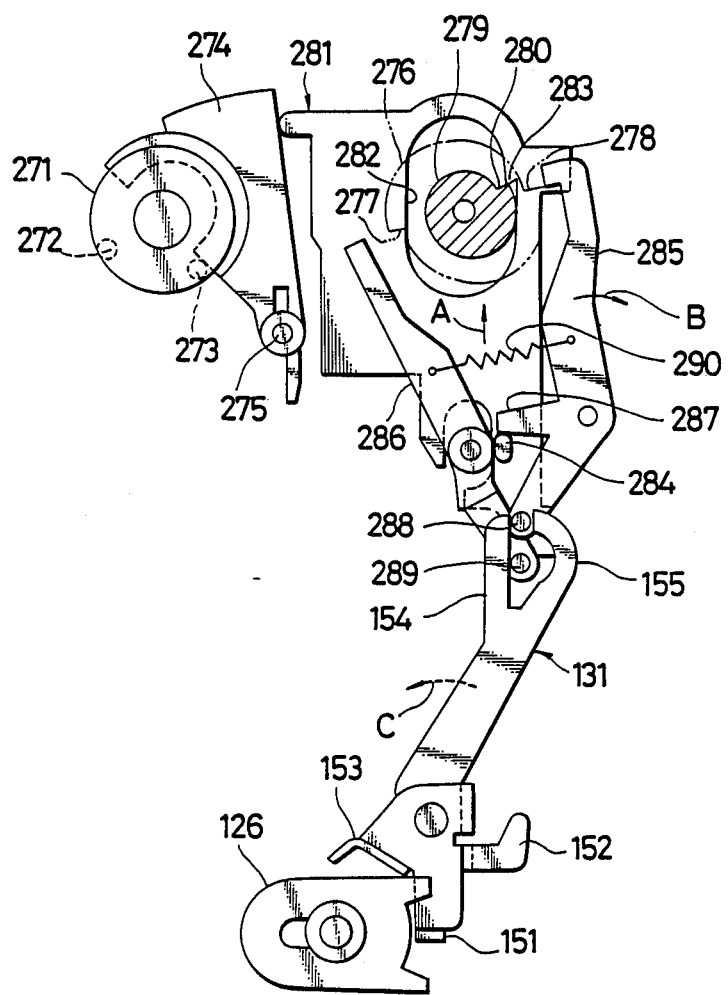
FIG. 16 is a plan view showing a rotation detecting member and an associated mechanism.

Referring to FIG. 16, an annular ring 271 is located in contact under a low pressure with a lower surface of the gear 214 which drives the right reel shaft 206. The annular ring 271 has a pair of pins 272, 273 provided projectingly on a lower surface thereof. A rotation detecting member 274 is located near the ring 271 and supported for pivotal motion around a shaft 275 secured to the tape recorder base plate 101. Thus, in whichever direction the reel 206 rotates, the rotation detecting member 274 is pressed by the pin 272 or 273 and receives a force to pivot rightwardly in a clockwise direction around the shaft 275.

Figure 17:
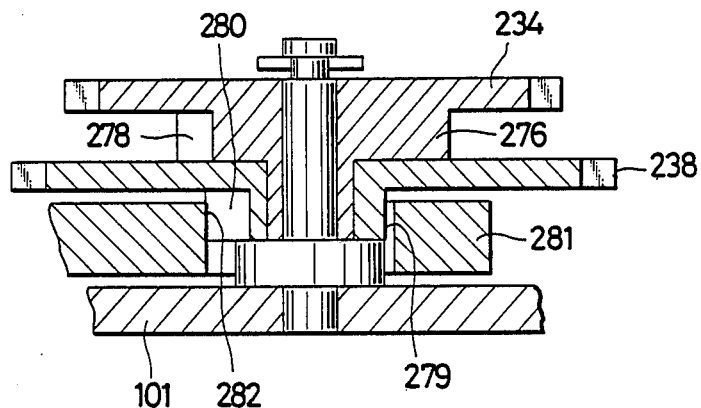
FIG. 17 is a vertical sectional view, in an enlarged scale, of a change-over gear and associated parts therearound.

A rotary pawl 276 is formed in an integral relationship on a lower surface of the gear 234 as shown in FIGS. 16 and 17. The rotary pawl 276 has a symmetrical profile with respect to its axis of rotation and has a pair of engaging shoulders 277, 278 at symmetrical positions thereof. Meanwhile, a rotary cam 279 is formed in an integral relationship on a lower surface of the reverse driving gear 238. The rotary cam 279 has a spiral cam surface around an outer periphery thereof which defines an engaging shoulder 280 between a maximum radius portion and a minimum radius portion thereof.

Referring to FIGS. 16 and 17, a rockable plate 281 made of a synthetic resin material is located rightwardly of the rotation detecting member 274. The rockable plate 281 has an opening 282 formed therein for receiving the rotary cam 279 therein and further has an engaging portion 283 formed on a right side edge of the opening 282 and a pressing projection 284 formed on an upper surface thereof. Two arresting levers 285, 286 are mounted for pivotal motion near the change-over gear 234 as shown in FIG. 16. The arresting lever 285 serves as a trigger member and has at an end thereof an arresting pawl which normally engages with either one of the arresting shoulders 277, 278 on the outer periphery of the rotary pawl 276 (FIG. 16 shows the arresting lever 285 having just disengaged from the arresting should 278), and in this position, either one of the non-meshing portions 236, 237 provided on the change-over gear 234 is opposed to the gear 257. The arresting lever 285 has a pressure receiving piece 287 and an engaging projection 288 provided thereon. The pressure receiving piece 287 of the arresting lever 285 is located forwardly of the pressing projection 284 of the rockable plate 281. Meanwhile, the arresting lever 286 has one end located in an opposing relationship to an outer periphery of the rotary pawl 276 from a side opposite to the arresting lever 285. The arresting lever 286 has an engaging projecting 289 at the other end thereof, and a tension spring 290 extends between the arresting levers 285, 286 and urges them to engage with the rotary pawl 276. The operating force transmitting member 131 is located such that the engaging projection 289 of the arresting lever 286 may be positioned at a cental position in a spacing formed between the pressing pieces 154 and 155 of the operating force transmitting member 131 and the engaging projection 288 of the arresting lever 285 may be located between ends of the pressing pieces 154 and 155 as shown in FIG. 16.

Here, operative relations among the rotation detecting member 274, rockable plate 281 and arresting levers 285, 286 will be described. In particular, it is assumed that the reel shaft 206 is rotating while the arresting lever 285 is engaged with the arresting shoulder 278 of the rotary pawl 276. Thus, as the reel shaft 206 rotates, the ring 271 is urged to rotate therewith so that either one of the pins 272, 273 presses against the rotation detecting member 274. As a result, the rotation detecting member 274 is pivoted rightwardly in the clockwise direction, and the rockable plate 281 is pushed rightwardly by the rotation detecting member 274. Consequently, the rockable plate 281 is rocked repetitively by the rotary cam 279 with an outer periphery of the rotary cam 279 slidably engaged with a left side edge of the opening 282 of the rockable plate 281. Accordingly, the engaging portion 283 of the rockable plate 281 is prevented from engaging with the engaging shoulder 280 of the rotary cam 279. In this condition, if a tape comes to its end and rotation of the reel shaft 206 is stopped (this involves slipping of the gear 249 due to an overload), a pressing force applied to the rockable plate 281 disappears. Consequently, the rockable plate 281 is stopped at a position displaced leftwardly by a maximum radial portion of the rotary cam 279. Accordingly, the engaging shoulder 280 of the rotary cam 279 is engaged with the engaging portion 283 of the rockable plate 281 so that the rockable plate 281 is moved in a direction indicated by an arrow mark A in FIG. 16 by a turning force of the rotary cam 279. As a result, the pressing projection 284 provided on the rockable plate 281 presses against the pressure receiving piece 287 of the arresting lever 285 and pivots the arresting lever 285 in a clockwise direction as indicated by an arrow mark B in FIG. 16. Consequently, the arresting lever 285 is brought out of engagement with the engaging shoulder 278 (or 277) of the change-over gear 234, thereby cancelling the arrested condition of the gear 234.

Figure 18:
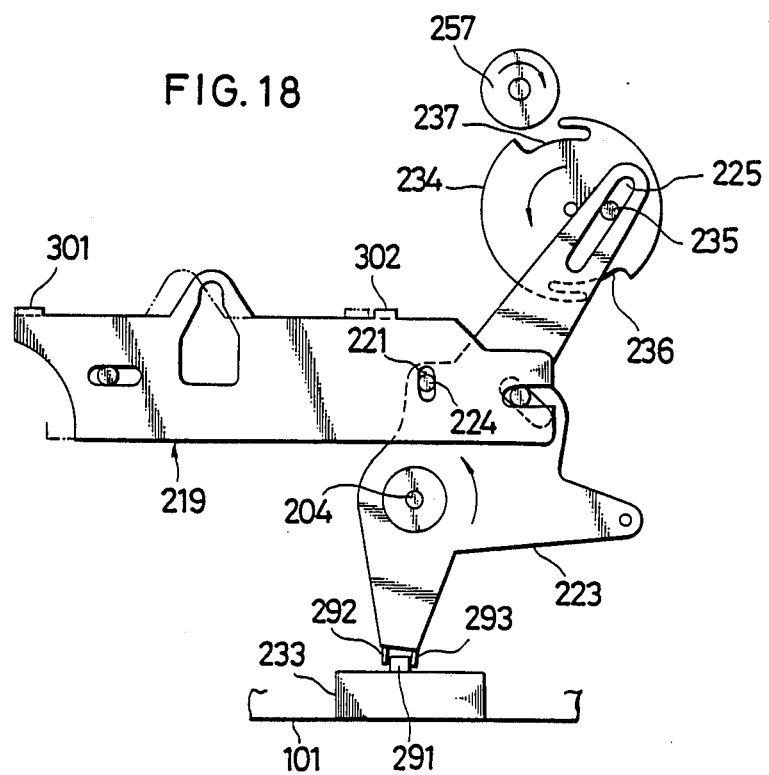
FIG. 18 is a plan view showing the change-over gear and its associated parts.

Referring now the FIG. 18, the pivotal change-over plate 223 has a pair of elastic members 292, 293 between which a movable change-over piece 291 of the polarity reversing switch 233 is held, and accordingly the movable change-over piece 291 is changed over by the elastic member 292 or 293 of the pivotal change-over plate 223 each time the change-over gear 234 makes a half rotation. Possible excessive pivotal motion of the pivotal change-over plate 223 is absorbed by elastic deformation of the elastic member 292 or 293, and a restoring force of the thus elastically deformed elastic member 292 or 293 acts to rotate the change-over gear 234 in a counterclockwise direction in FIG. 18 by way of the pivotal change-over plate 223. Accordingly, when the arresting lever 285 is brought out of engagement with the arresting shoulder 278 or 277 of the rotary pawl 279 as shown in FIG. 16, the change-over gear 234 is rotated a little in the counterclockwise direction by the restoring force of the elastic member 292 or 293 of the change-over gear 234 and is engaged with and thus rotated by the normally rotating gear 257.

After half rotation of the change-over gear 234, the arresting lever 285 is engaged and thus stopped from rotation by the other arresting shoulder 277 and 278. In the meantime, the piovtal change-over plate 223 is turned over due to engagement of the engaging pin 235 on the change-over gear 234 with the engaging hole 225 of the pivotal change-over plate 223. As the pivotal change-over plate 223 is turned over in this manner, the switch 233 is switched and the supply side detecting member arresting plate 219 is moved leftwardly or rightwardly due to the engagement of the engaging hole 221 thereof with the engaging pin 224 on the pivotal change-over plate 223.

Figure 19:
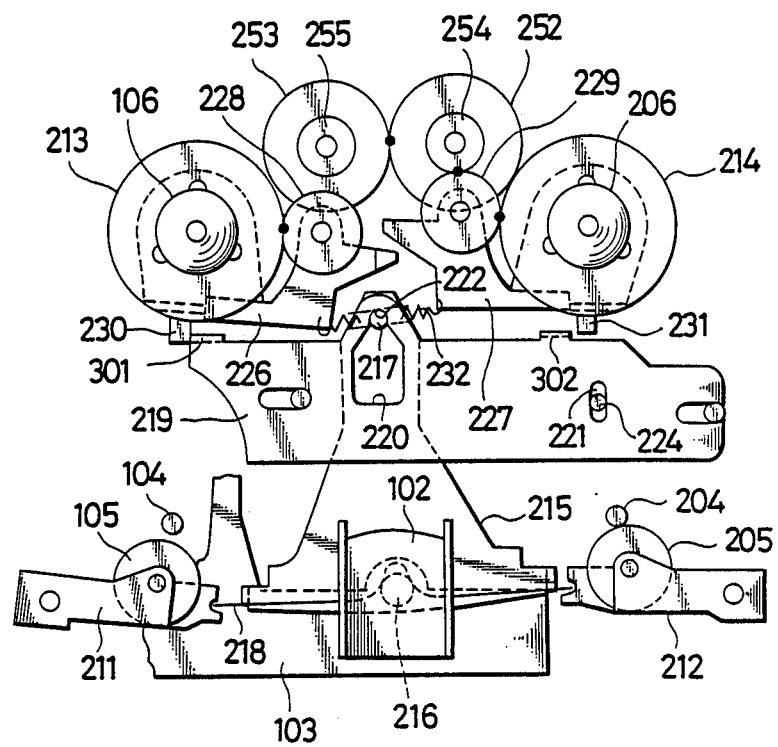
FIGS. 19 and 20 are plan views showing a supply side detecting member arresting plate and an assoicated mechanism.
Figure 20:
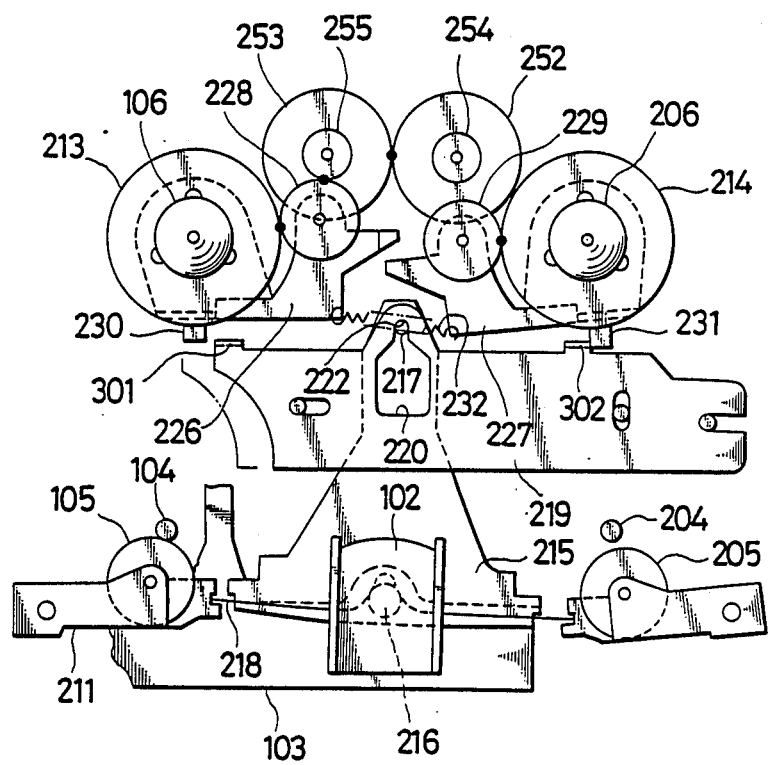

Referring to FIGS. 19 and 20, there is shown a relationship between the supply side detecting member arresting plate 219 and associated mechanisms therearound when the head mounting plate 103 is in its advanced position (operative position). When the head mounting plate 103 is in its advanced position in this manner, the cam pin 217 of the pinch roller changer-over plate 215 is fitted in the hole 222 at the end of the cam hole 220. FIG. 19 shows the arresting plate 219 in a leftwardly moved position. In this position, a pressing lug 301 provided on the arresting plate 219 presses leftwardly against the projection 230 of the left pivotal plate 226 to hold the gear 228 spaced away from the gear 255. Further, the pinch roller change-over plate 215 is inclined leftwardly to hold the left pinch roller 105 spaced away from the capstan shaft 104 by the left end of the spring rod 218 thereon while the right pinch roller 205 is pressed against the capstan shaft 204 by the right end of the spring rod 218. Accordingly, a turning force of the motor 239 is transmitted to the right reel shaft 206 so that a tape is clamped between the right capstan shaft 204 and pinch roller 205 and is fed thereby in a rightward direction in FIG. 19 and wound up on a right reel within a tape cassette.

Meanwhile, FIG. 20 shows the arresting plate 219 in a rightwardly moved position. In this position, another pressing lug 302 provided on the arresting plate 219 presses rightwardly against the projection 231 of the right pivotal plate 227 to hold the gear 229 spaced away from the gear 254. Further, the pinch roller change-over plate 215 is inclined rightwardly to hold the right pinch roller 205 spaced away from the capstan shaft 204 by the right end of the spring rod 218 thereon while the left pinch roller 105 is pressed against the capstan shaft 104 by the left end of the spring rod 218. Accordingly, a turning force of the motor 239 is transmitted to the left reel shaft 106 so that the tape is clamped between the left capstan shaft 104 and pinch roller 105 and is fed thereby in a leftward direction in FIG. 20 and wound up on a left reel within the tape cassette. As will be appreciated from the foregoing description taken in conjunction with FIGS. 16 to 20, in whichever direction a tape is fed, when the tape comes to its end, a pressing force against the rotation detecting member 274 will disappear, which will cancel the engagement between the arresting lever 285 and the rotary pawl 276. Consequently, the arresting plate 219 will be slid in the opposite direction to change over the feeding direction of the tape. Thus, an automatic reversing mechanism is constituted.

With the construction described above, when it is intended to effect fast feeding of a tape while a reproducing operation is being conducted, the second operating member 109 may be pushed in against the tension spring 125. If the second operating member 109 is operated in this manner, only the head mounting plate 103 is retracted and the second operating member 109 is arrested to the pushed in position by the arresting mechanism 140 as described hereinabove with reference to FIGS. 6 and 9. As the head mounting plate 103 is thus retracted, a turning load caused by the capstan shaft and the associated pinch roller clamping a tape therebetween disappears, resulting in increase of the feeding speed of the tape to attain a high speed forward feeding of the tape. It is to be noted that in order to stop the high speed feeding of the tape and bring the tape recorder into a reproduction mode before the tape comes to its end, the first operating member 108 may be pushed in to a position in which the arresting condition of the arresting mechanism 140 is cancelled.

Figure 11B:
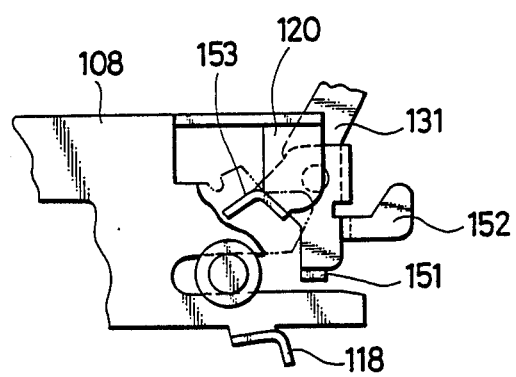

When it is intended, during reproduction, to feed a tape in a reverse direction at a high speed (for rewinding), the first operating member 108 may be pushed in. As the first operating member 108 is thus operated, the head mounting plate 103 is retracted and, as described hereinabove in connection with FIG. 12, the pressing piece 120 of the first operating member 108 once presses against the pressure receiving piece 153 of the operating force transmitting member 131 immediately after the engaging lug 145 of the first operating member 108 has pushed the portion 142 of the arresting mechanism 140 to move the arresting mechanism a little, and then the engaging lug 145 is arrested by the arresting hole 147 of the arresting mechanism 140. While the pressing lug 120 of the first operating member 108 moves across the pressure receiving piece 153 as shown in FIG. 11(b), as the pressure receiving piece 153 is pressed, the operating force transmitting member 131 is pivoted in a counterclockwise direction as indicated by an arrow mark C in FIG. 16. Consequently, the pressing piece 155 of the operating force transmitting member 131 presses against the engaging projection 288 of the arresting lever 285 to forcibly cancel the engagement of the arresting lever 285 with the arresting shoulder 277 or 278 of the rotary pawl 276. This relationship is similar to that in an automatic reversing operation described above. Accordingly, the arresting plate 219 is moved to change over the feeding direction of the tape. Since the head mounting plate 103 is in its retracted position then as described hereinabove, reverse feeding at a high speed will be achieved similarly to a fast feeding operation. It is to be noted that in order to stop the operation, the second operating member 109 may be pushed in to a position in which the arresting operation by the arresting mechanism 140 is cancelled. Since the pressing piece 120 of the first operating member 108 presses against the pressure receiving piece 153 of the operating force transmitting member 131 again as the first operating member 108 is moved in its returning direction, the operating force transmitting member 131 is pivoted by the same again in the direction of the arrow mark C in FIG. 16. This causes the arresting plate 219 to slide in the reverse direction to change over the feeding direction of the tape so as to feed the tape in a direction in which the tape was fed before such rewinding operation.

Meanwhile, when it is intended to manually start a reversing operation, the first and second operating members 108 and 109 may be pushed in at a same time. As the operating members 108, 109 are operated in this manner, as described hereinabove in connection with FIG. 7, the tape feeding direction change-over member 126 is advanced a predetermined distance together with the first and second operating members 108, 109 to press against the vertically bent lug 151 of the operating force transmitting member 131 from a position to which the first and second operating members 108, 109 have been pushed in by a predetermined amount. Consequently, the operating force transmitting member 131 is pivoted in the direction indicated by the arrow mark C in FIG. 16. Consequently, the engagement between the arresting lever 285 and the rotary pawl 276 is cancelled to change over the feeding direction of the tape. In this instance, the head mounting plate 103 has not conducted a retracting motion and hence is not in its retracted position. Accordingly, reversing operation is activated by manual operation. It is to be noted that even if the first and second operating members 108, 109 are held operated for reversing operation and thus the arresting lever 285 is held out of engagement with the engaging portion 283 of the rockable plate 281 for a long time, such a trouble that the gear 234 continues to rotate to repeat reversing operation many times because the engaging shoulder 278 or 277 of the rotary pawl 276 will be contacted with the top end of the arresting lever 286 when the gear 234 makes a half rotation.

Meanwhile, if the tape comes to its end while a high speed feeding operation or a rewinding operation is progressing in such a manner as described above, similarly as in aan automatic reversing operation, the arresting lever 285 is pushed to pivot by the pressing projection 284 of the rockable plate 281. This pivotal motion of the arresting lever 285 causes the engaging projection 288 provided on the arresting lever 285 to pivot the operating force transmitting member 131 in the direction indicated by the arrow mark C in FIG. 16. Consequently, the projection 152 provided on the operating force transmitting member 131 pushes the portion 142 of the arresting mechanism 140 to move the arresting mechanism 140 against the tension spring 144. As a result, the engaging lug 145 or 146 arrested by the arresting hole 147 of the arresting mechanism 140 is released from such arresting engagement with the latter thereby to allow automatic returning of the operating member 108 or 109 which has been arrested by the arresting mechanism 140.

As described hereinabove, when a tape comes to its end while the first or second operating member 108 or 109 is arrested to its actuated position by the arresting mechanism 140, the arresting lever 285 serving as a trigger member moves the operating force transmitting member 131 to cancel the arrested condition of the first or second operating member 108 or 109 by the arresting mechanism 140. Accordingly, the operating force transmitting member 131 exhibits a function of transmitting a move force of the first or second operating member 108 or 109 to the arresting lever 285 and another function of cancelling the arrested condition of the first or second operating member 108 or 109 in response to arrival of a tape end when the tape recorder is in a fast feeding mode or in a rewinding mode. Accordingly, the rotation transmission mechanism for recording and reproduction can be used also for fast feeding and for rewinding. This allows tape recorders to be simplified in construction and produced at a reduced cost.

Having now fully described the invention, it will be apparent to one of ordinary skill in the art that may changes and modifications can be made thereto without departing from the spirit and scope of the invention as set forth herein.

What is claimed is:

1. A tape recorder of the type which includes a pair of capstan shafts, pinch rollers and reel receiving elements located on opposite left and right sides of a magnetic head, a tape feeding direction change-over mechanism for mechanically changing over the feeding direction of a magnetic tape, and a trigger member for mechanically detecting stopping of said reel receiving elements to activate said tape feeding direction changeover mechanism, and wherein recording or reproducing operation is allowed whether a magnetic tape recorder is fed in a leftward direction or in a rightward direction, comprising first and second operating members mounted for individual reciprocal movement in a parallel relationship to each other and each member being operable, when advanced more than a predetermined amount, by a portion of the motion thereof over the predetermined amount for retracting said magnetic head from a recording or reproducing position, an arresting mechanism operable when said first or said second operating member is advanced to retract said magnetic head from the recording or reproducing position for arresting the advanced operating member to its actuated position, a transmission member which is moved, when said first operating member is advanced an amount greater than the predetermined amount, by said first operating member to move said trigger member to actuate said tape feeding direction change-over mechanism, and a tape feeding direction change-over member mounted for pivotal movement and for linear movement by a fixed amount, said tape feeding direction change-over member being engageable with said first and second operating members, whereby when one of said first and second operating members is alternatively advanced, said tape feeding direction change-over member is pivoted in one or the other dirction and allows the one operating member to be moved more than the predetermined amount, but when said first and second operating members are operated at a same time, said tape feeding direction change-over member is precluded from pivotal motion in either direction and is urged by said first and second operating members to linearly move a predetermined amount and then prohibits further movement of said first and second operating members beyond the predetermined amount, and when said tape feeding direction change-over member thus effects linear movement, said tape feeding direction change-over member moves said transmission member to operate said tape feeding direction change-over mechanism to move said trigger member to cancel the arresting condition by said arresting mechanism.

2. A tape recorder according to claim 1, wherein said tape feeding direction change-over member has a pair of inclined surfaces on opposite sides thereof, and said first and second operating members have portions located adjacent said opposite sides of said tape feeding direction change-over member such that when one of said first and second operating members is advanced, said portion thereof is engaged with the associated one of said inclined surfaces of said tape feeding direction change-over member to pivot said tape feeding direction change-over member in one or the other direction, but when said first and second operating members are advanced at a same time, said portions of said first and second operating members press simultaneously against said inclined surface to hold said tape feeding direction change-over member from pivotal motion in either direction and urge said tape feeding direction change-over member to linearly move the predetermined amount.

3. A tape recorder according to claim 1, wherein each of said frist and second operating members has a guide hole formed therein, and said tape recorder further comprises a moveable roller element extending through said guide holes of said first and second operating members and also through a guide hole formed in a head mounting plate on which said magnetic head is mounted, whereby when one of said first and second operating member is advanced, said roller element is guided along the guide hole in and moved by the one operating member to retract said head mounting plate and said magnetic head from their recording or reproducing positions.

* * * * *